US010504561B2

(12) United States Patent
Demiris (10) Patent No.: US 10,504,561 B2
(45) Date of Patent: Dec. 10, 2019

(54) MEDIA EDITING SYSTEM AND METHOD WITH LINKED STORYBOARD AND TIMELINE

(75) Inventor: Chris P. Demiris, Sandy, UT (US)

(73) Assignee: Corel Corporation, Ottawa (CA)

( * ) Notice: Subject to any disclaimer, the term of this patent is extended or adjusted under 35 U.S.C. 154(b) by 1078 days.

(21) Appl. No.: 13/323,346

(22) Filed: Dec. 12, 2011

(65) Prior Publication Data

US 2013/0151965 A1 Jun. 13, 2013

(51) Int. Cl.
*G11B 27/34* (2006.01)
(52) U.S. Cl.
CPC .................................. *G11B 27/34* (2013.01)
(58) Field of Classification Search
CPC .............. G11B 27/00–06; G11B 27/34; H04N 21/854–8549; G08B 13/19678; G06F 3/0485; G06F 3/0484
USPC ................. 715/202, 203, 716, 719–726, 731
See application file for complete search history.

(56) References Cited

U.S. PATENT DOCUMENTS

| | | | | |
|---|---|---|---|---|
| 5,023,851 | A * | 6/1991 | Murray et al. | 368/41 |
| 5,039,937 | A * | 8/1991 | Mandt et al. | 324/121 R |
| 5,187,776 | A * | 2/1993 | Yanker | 715/800 |
| 5,467,288 | A * | 11/1995 | Fasciano et al. | 715/716 |
| 5,786,814 | A * | 7/1998 | Moran et al. | 715/720 |
| 5,877,760 | A * | 3/1999 | Onda et al. | 715/784 |
| 6,515,656 | B1 * | 2/2003 | Wittenburg et al. | 345/418 |
| 7,398,002 | B2 | 7/2008 | Hsiao et al. | |
| 7,434,155 | B2 | 10/2008 | Lee | |
| 7,877,690 | B2 | 1/2011 | Margulis | |
| 2010/0220978 | A1 | 9/2010 | Ogikubo | |
| 2012/0042251 | A1 * | 2/2012 | Rodriguez | G11B 27/034 715/723 |
| 2013/0124996 | A1 * | 5/2013 | Margulis | G06F 3/0484 715/719 |

OTHER PUBLICATIONS

"A Magnifier Tool for Video Data" by Michael Mills et al.*
"A Multi-View Intelligent Editor for Digital Video Libraries" by Brad A Myers et al.*
"IMovie HD" a tutorial by David Wilson archived by Internet Wayback Machine downloaded on Feb. 22, 2016 from https://web.archive.org/web/20060516043646/http://www.ischool.utexas.edu/technology/tutorials/graphics/imoviehd/imoviehd.pdf.*
"Word 2010: Synchronous Scrolling (View Side by Side)" by Usman Javaid, Apr. 3, 2010, downloaded Oct. 2, 2017 from https://www.addictivetips.com/microsoft-office/word-2010-synchronous-scrolling-view-side-by-side/.*
International Search Report for application No. PCT/CA2012/001136 dated Mar. 19, 2013.

* cited by examiner

*Primary Examiner* — Mandrita Brahmachari
*Assistant Examiner* — Bille M Dahir
(74) *Attorney, Agent, or Firm* — Rosenberg, Klein & Lee (57) ABSTRACT

A time-based media composition application simultaneously displays both a storyboard and a timeline representation of a media composition in a graphical user interface. The correspondence between a given storyboard element and its one or more corresponding timeline elements is shown by means of a graphical indication within the GUI, such as by displaying a spotlight from the given storyboard element to the corresponding timeline element. The user is able to scroll the displayed portions of each of the storyboard and the timeline forward or backward in time independently, while maintaining the graphical indication of correspondence between a selected storyboard element and timeline element pair.

16 Claims, 3 Drawing Sheets

MEDIA EDITING SYSTEM AND METHOD WITH LINKED STORYBOARD AND TIMELINE

BACKGROUND

Media editing tools provide a number of representations of the current state of a video composition that is being edited. Most common are the timeline representation and the storyboard representation. Timeline representations represent a composition as a sequence of clips, each of the clips having a length corresponding to the temporal duration of the clip. Thus the timeline provides a view of the temporal makeup of a composition. The storyboard representation shows the sequence of items in a composition as a sequence of elements that are displayed in a manner that is unrelated to the temporal duration of the element. For example, each storyboard element may be displayed with a fixed size, or have a size determined by the quantity of descriptive text displayed for the element. The storyboard representation provides a convenient indication of the sequence of story elements or other thematic units within the composition, regardless of their temporal duration.

In existing systems, the user must choose one of the two representations. For example, when working with the storyboard, duration information is not shown. Conversely, when working with the timeline, the overall thematic structure of the composition may not be apparent.

SUMMARY

In general, the methods, systems, and computer program products described herein enable a user of a media composition system to view a storyboard representation and a timeline representation simultaneously. A graphical indication, such as a "spotlight" indicates a correspondence between a selected element in one of the storyboard representation or timeline representation and its opposite number in the other representation. The user can scroll the storyboard and the timeline independently of each other, while the graphical indication updates to retain the connection between a pair of corresponding elements.

In general, in one aspect, a method of representing a media composition in a graphical user interface of a media composition application includes: displaying a storyboard representation of the media composition in the graphical user interface, wherein the storyboard includes a plurality of story elements arranged in a sequence in which the storyboard elements appear in the media composition; displaying a timeline representation of the media composition in the graphical user interface, wherein the timeline comprises elements that are arranged in a sequence in which the timeline elements appear in the media composition, and wherein a linear dimension of a given one of the displayed timeline elements is representative of a temporal duration of the given displayed timeline element, and wherein each of the story elements corresponds to one or more of the timeline elements; and displaying in the graphical user interface a graphical indication of a relationship between an individual one of the storyline elements and its corresponding one or more timeline elements.

Various embodiments include one or more of the following features. The graphical indication includes a representation of a temporal duration of the one or more timeline elements that correspond to the individual one of the storyboard elements. The graphical indication includes a highlighted region connecting the individual one of the storyboard elements and its one or more corresponding timeline elements. The highlighted region defines a spotlight beam shape. The individual one of the storyline elements is specified by a current location of playback by the media composition application of the media composition, or is selected by a user of the media composition application. The individual one of the storyline elements corresponds to one or more timeline elements that are selected by a user of the media composition system. Enabling a user of the media composition application to shift the displayed storyboard representation forward or backward in time and updating the graphical indication of a relationship between the individual one of the storyline elements and its corresponding one or more timeline elements to accommodate a new displayed location of the individual one of the storyline elements. Automatically shifting the timeline representation in order to display a portion of the timeline that includes at least one element that corresponds to a displayed element of the storyboard. Enabling a user of the media composition system to shift the displayed timeline representation forward or backward in time and updating the graphical indication of a relationship between the individual one of the storyline elements and its corresponding one or more timeline elements to accommodate a new displayed location of the corresponding one or more timeline elements. Automatically scrolling the storyboard representation in order to display a portion of the storyboard that includes at least one element that corresponds to a displayed element of the timeline.

In general, in another aspect, a method of representing a media composition on a graphical display of a media composition application includes: displaying on the graphical display a storyboard representation of a first portion of the media composition, the first portion including at least a subset of story elements of which the media composition is comprised, wherein a storyboard includes a plurality of story elements arranged in a sequence in which the story elements appear in the media composition; displaying on the graphical display a timeline representation of a second portion of the media composition, wherein the timeline comprises elements that are arranged in a sequence in which the timeline elements appear in the media composition, and wherein a linear dimension of a given one of the displayed timeline elements is representative of a temporal duration of the given displayed timeline element, and wherein each of the story elements corresponds to one or more of the timeline elements; wherein a user of the media composition application is able to change the first portion of the media composition that is represented by the displayed storyboard representation without changing the second portion of the media composition that is represented by the displayed timeline; and wherein the user of the media composition application is able to alter the second portion of the media composition that is represented by the displayed timeline representation without altering the first portion of the media composition that is represented by the displayed storyboard.

Various embodiments include the following feature. Displaying a graphical indication of a relationship between an individual element displayed in the storyboard representation and a corresponding element displayed in the timeline representation, wherein the graphical indication is updated to reflect changes by the user of the first portion of the media composition represented by the displayed storyboard representation and the second portion of the media composition represented by the displayed timeline representation.

In general, in a further aspect, a computer program product includes a computer-readable medium with computer program instructions encoded thereon, wherein the computer program instructions, when processed by a computer, instruct the computer to perform methods of representing a media composition in a graphical user interface of a media composition application, the methods including those described above.

In general, in yet another aspect, a computer system for editing a media composition includes a processor programmed to perform media editing methods, including the methods described above.

DETAILED DESCRIPTION

Non-linear media composition systems generally include a display that features a timeline representing the current state of a media composition. Timelines indicate the series of elements that are included within the composition, with each element having a displayed dimension, typically a length, proportional to the temporal duration of that element. Timelines are part of the user interface in commercially available non-linear media editing systems, such as Media Composer® from Avid Technology, Inc. of Burlington, Mass., described in part in U.S. Pat. Nos. 5,267,351 and 5,355,450, which are incorporated by reference herein, and Final Cut Pro® from Apple Computer, Inc. of Cupertino Calif. Timelines enable media editors, such as video and audio editors to visualize the temporal makeup of a composition since they provide a visual analog of the temporal duration of each time-based media constituent of the composition. The timeline may also indicate other components of the composition, such as audio, text, graphics, effects, transitions, and so on. Such components can be shown in separate tracks, laid out along a single time axis.

By contrast, the storyboard view does not show temporal duration. Rather, it displays the sequence of story elements without indicating the duration of each element. It provides a convenient high-level representation of the composition. In addition, the order in which story elements appear in the composition is readily edited by manipulating the elements in the storyboard view.

Thus each of the timeline and storyboard, representations provides useful information on the media composition. In the described system, both the timeline and the storyboard are displayed in a graphical user interface, thereby giving the editor a fuller single-screen view of the state of the composition than systems that provide only one representation at a time. Advantages of such an interface include but are not limited to: providing an editor with a combined thematic and temporal overview of the composition and a consequent need for less switching among different user interface windows; the ability to edit the composition by manipulating story elements or clips without switching among different windows; and providing the ability to manipulate other elements of the composition, such as music and effects, in relation to both the temporal sequence and the thematic, i.e., story sequence.

Figure 1A:
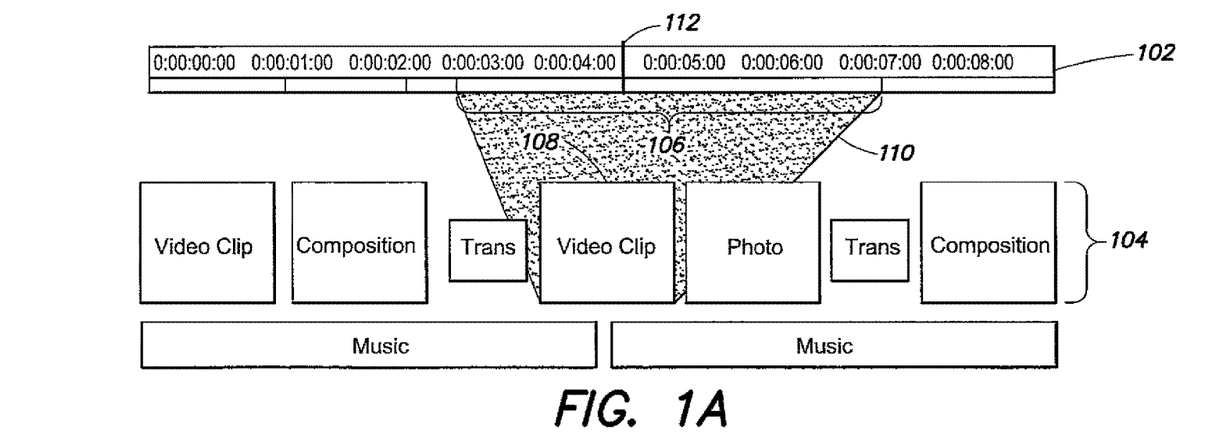
FIG. 1A is a diagrammatic representation of a media editing graphical user interface with both storyboard and timeline representations and a spotlight-type indication of the correspondence between story line and timeline representations of an element.
Figure 1B:
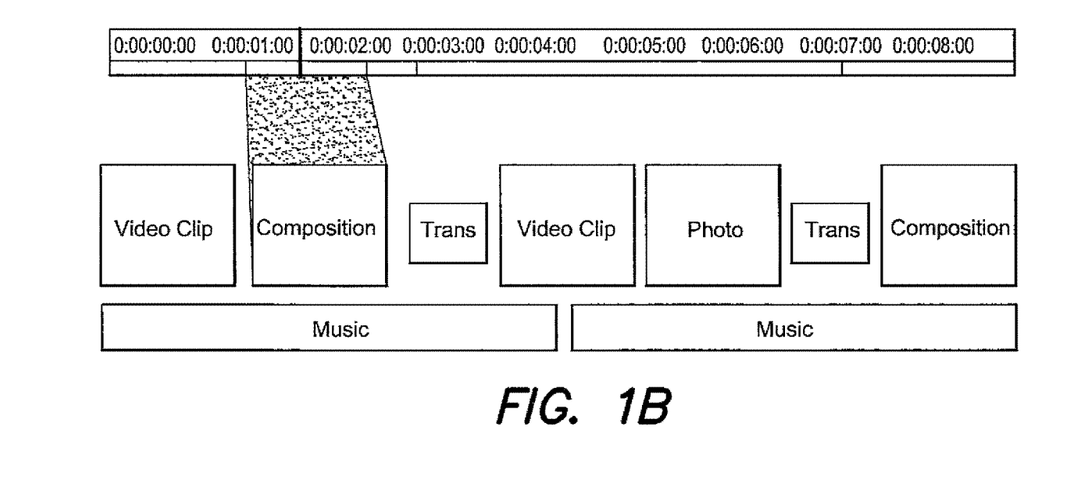
FIG. 1B shows the graphical user interface of FIG. 1A in which correspondence between elements spanning a different temporal location in the media composition is displayed.
Figure 2:
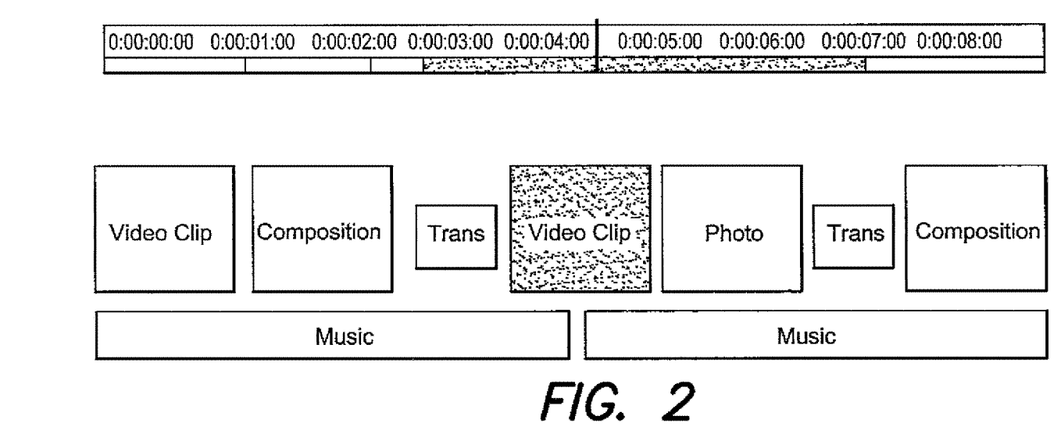
FIG. 2 is a diagrammatic representation of a media editing graphical user interface with both storyboard and timeline representations showing correspondence among elements using element shading.
Figure 3:
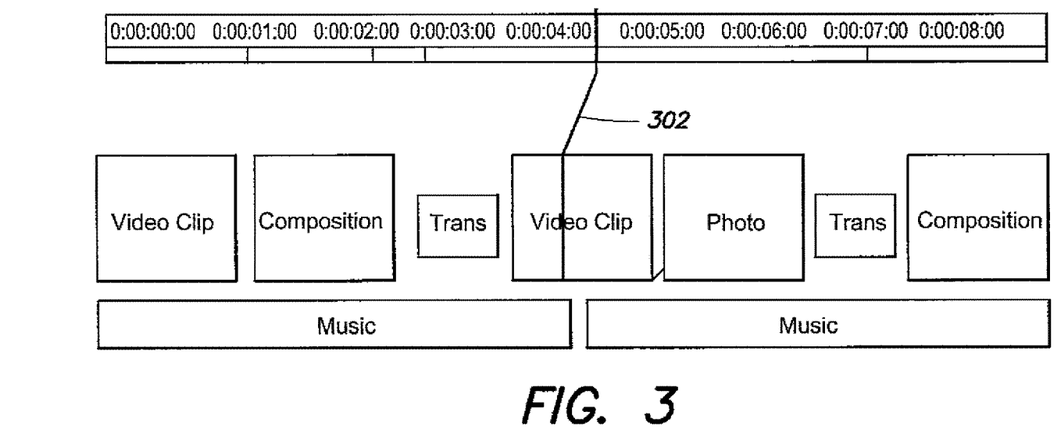
FIG. 3 is a diagrammatic representation of a media editing graphical user interface with both storyboard and timeline representations showing correspondence among elements using a single current location cursor.
Figure 4:
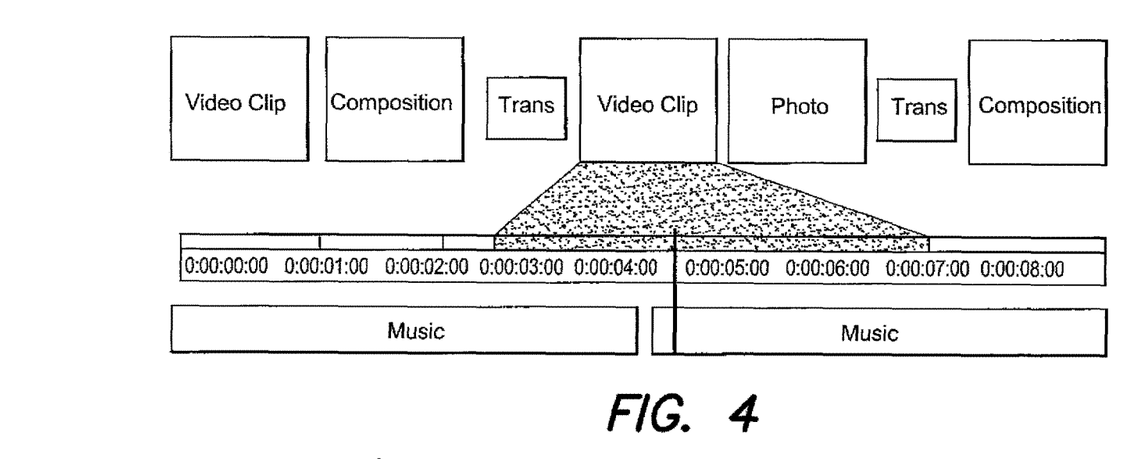
FIG. 4 is a diagrammatic representation of a media editing graphical user interface with both storyboard and timeline representations showing a spot-light type indication of correspondence with the storyboard displayed above the timeline.

The editing system indicates the relationship between the storyboard and the timeline by displaying a correspondence between a given storyboard item and the one or more timeline elements that represent the storyboard element in the media composition. The user may select either a clip element in the timeline or a story element in the storyboard, and the system displays the appropriate correspondence. FIGS. 1A and 1B show a diagrammatic view of a graphical display of a media editing system, including timeline 102 and storyboard 104. In the example illustrated in FIG. 1A, the correspondence between timeline element, or clip 106 and storyboard element 108 is represented by shaded region 110. The elements span the current temporal location in the media composition being edited as indicated by current location cursor (variously referred to as the playback, scrubber, or blue bar) 112. In FIG. 1B, the highlighting of the correspondence is shown for a different time in the media composition. Another method of indicating a correspondence between story element and timeline element involves shading corresponding elements with a distinctive color, as illustrated in FIG. 2. The correspondence may alternatively be indicated by displaying bounding lines or brackets around corresponding elements. FIG. 3 shows a different approach, in which correspondence between the timeline and the storyboard is shown by single current location cursor 302 connecting the timeline with the storyboard. The cursor movement within the timeline corresponds to the normal temporal indication of the playback location, whereas within the storyboard, the movement may be discontinuous, with the cursor jumping from one storyboard element to the next when the playback location crosses from media corresponding to one storyboard element to the next, or alternatively it may move though the displayed storyboard element as if it were a timeline, but at a speed scaled to a displayed dimensions of the storyboard item. Various other graphical indications of correspondence between timeline elements and storyboard elements may be used, including linking lines, arrows, and various shapes that serve to highlight the correspondence. An alternative layout is illustrated in FIG. 4, in which the storyboard is displayed above the timeline.

Figure 5:
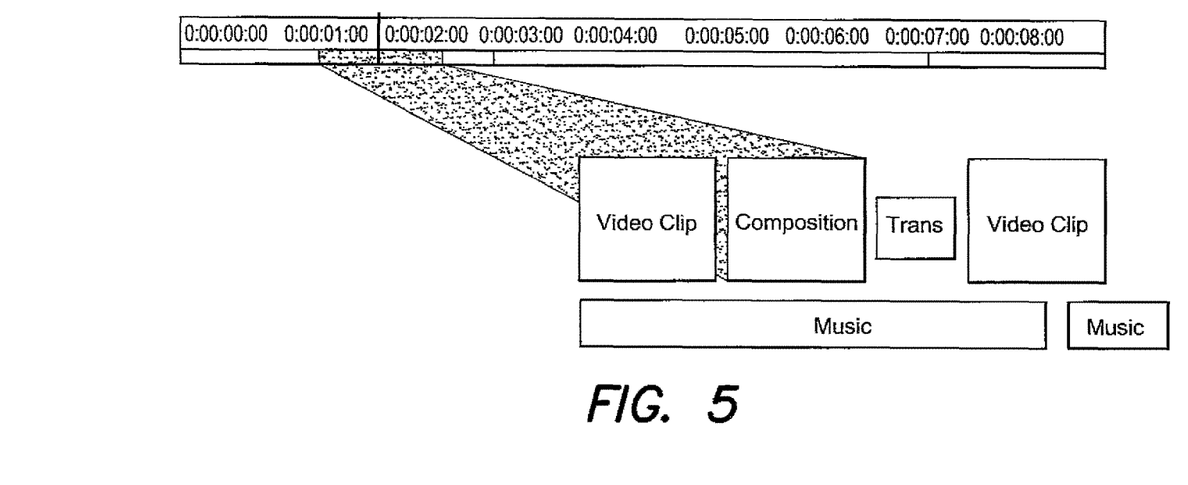
FIG. 5 illustrates updating of the indication of correspondence between elements shown in FIG. 1B when the storyboard is shifted.

When the media composition system is running on a portable device, such as a tablet or smart phone, the display screen is generally too small to show the storyboard and timeline of the entire composition. Instead, a portion of the storyboard and timeline is displayed that includes the elements currently being edited. In order to view or select for editing elements that are outside the currently displayed range, the user may slide or scroll each of the storyboard and the timeline forward or backward to display a new portion of the composition. In the described embodiment, the user may slide or drag each of the storyboard and the timeline independently of each other. If an element in the storyboard and its corresponding element in the timeline are highlighted and the correspondence is indicated graphically, the graphical indication is updated to account for the movement of either of the storyboard or timeline. For example, a spotlight indication continues to connect the storyboard element to its corresponding timeline element, becoming longer or shorter and changing angle as needed to maintain the connection. FIG. 5 illustrates how the spotlight connection between elements shown in FIG. 1B is updated to preserve the correct correspondence when the storyboard is moved to the right. Such "elasticity" may be used for any of the graphical indications discussed above to preserve the indication of correspondence while the storyboard and/or the timeline are scrolled forward or backward in time. The graphical indication of correspondence between a timeline element and a storyboard element may continue to be displayed, even if one of the elements involved has been shifted off the display area. In this case, the highlighted region stops at the edge of the display area, indicating that the corresponding element is off screen.

In some embodiments, the timeline and storyboard may be locked to each other to that they scroll together automatically. The system may allow decoupled scrolling provided the corresponding elements at the current location within the media composition remain displayed. In another mode, when the editor scrolls the storyboard, the system automatically scrolls the timeline as necessary to display timeline elements corresponding to at least one of the displayed storyboard elements. Equally, when the timeline is scrolled, the storyboard position may also be shifted so that at least one of the displayed storyboard elements corresponds to the currently displayed timeline.

During playback, the system may automatically highlight the storyboard and timeline element corresponding pair based on a state of the media composition system, such as, for example, the current location of playback. While playing back a portion of the composition, the system may display a spotlight connection between the timeline element within which the playback bar is currently located, and the storyboard element to which it corresponds.

A single storyboard element may correspond to more than one timeline clip, in which case the graphical indication connects the storyboard element to more than one clip. In general, the clips are contiguous, and the graphical indication encompasses a single region of the timeline. If a storyboard element corresponds to a plurality of clips that are not contiguous, the graphical indication may indicate correspondences to the plurality of clips, for example by means of multiple spotlight beams.

The embodiments of media composition systems described above are directed primarily to media compositions that include video, and optionally also include other media types such as audio, effects, and interactive components. Other embodiments are used to edit media compositions without video, such as audio only compositions, or compositions with audio and interactive components.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), E Ink displays, plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from, magnetic, optical, or solid state drives, which may include an array of local or network attached disks.

A system such as described herein may be implemented in software or hardware or firmware, or a combination of the three. The various elements of the system, either individually or in combination may be implemented as one or more computer program products in which computer program instructions are stored on a non-transitory computer readable medium, for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of representing a media composition in a graphical user interface of a media composition application to a user, the method comprising:
displaying a portion of a storyboard representation of the media composition in the graphical user interface in dependence upon a display mode of the media composition application, wherein the storyboard representation includes a plurality of story elements arranged in a sequence in which the story elements appear in the media composition, and wherein each story element corresponds to a different media item included in the media composition during its composition, wherein a different media item is not a portion of another media item included in the media composition or derived from processing a predetermined portion of the media composition;
displaying a portion of a timeline representation of the media composition in the graphical user interface in dependence upon the display mode of the media composition application, wherein the timeline representation comprises a plurality of timeline elements each associated with a predetermined story element of the plurality of story elements that are arranged in a sequence in which the timeline elements appear in the media composition and displayed with a linear dimension defined by the display mode of the media composition application and a temporal duration of the timeline element within the associated story element;
receiving from the user a selection of a story element of the plurality of story elements or a selection of a timeline element of the plurality of timeline elements;
displaying in the graphical user interface a graphical element visually linking between the selected story element of the plurality of story elements and its corresponding one or more timeline elements when the user selection was of the selected story element and dynamically updating the graphical representation in dependence upon the subsequent positions of the selected story element and its one or more associated timeline elements in dependence upon the user scrolling at least one of the storyboard representation and the timeline representation;
displaying in the graphical user interface the graphical element visually linking between the timeline element of the plurality of timeline elements within the timeline representation of the media composition and its corresponding story element of the plurality of story elements within the storyboard representation of the media composition when the user selection was of the timeline element and dynamically updating the graphical representation in dependence upon the subsequent positions of the selected story element and its one or more associated timeline elements in dependence upon the user scrolling at least one of the storyboard representation and the timeline representation; wherein
in a first mode of operation the user may scroll the storyboard representation and the timeline representation independently of each other such that a selected story element remains displayed and its corresponding timeline element is shifted, wherein the graphical element is dynamically adjusted as the corresponding timeline element is shifted and the graphical user interface maintains displaying the graphical element between the timeline element of the plurality of timeline elements within the timeline representation of the media composition and its corresponding story element of the plurality of story elements within the storyboard representation of the media composition independent of whether the corresponding timeline element is still displayed, partially displayed, or no longer displayed; and
in a second mode of operation the user may scroll the storyboard representation and the timeline representation independently of each other such that a selected timeline element remains displayed and its corresponding story element is shifted, wherein the graphical element is dynamically adjusted as the corresponding story element is shifted and the graphical user interface maintains displaying the correspondence between the timeline element of the plurality of timeline elements within the timeline representation of the media composition and its corresponding story element of the plurality of story elements within the storyboard representation of the media composition independent of whether the corresponding timeline element is still displayed, partially displayed , or no longer displayed.

2. The method of claim 1, wherein
the graphical indication includes a representation of a temporal duration of the one or more timeline elements within the timeline representation that correspond to the individual one of the story elements which is independent of any periodic indicia indicative of time within the timeline representation.

3. The method of claim 1, wherein
the graphical indication comprises for each of the one or more timeline elements corresponding to a storyboard element a visually distinctive region within the graphical user interface having left and right edges, wherein
the left edge is defined by a line joining a predetermined point upon the left side of a representation of the individual one of the story elements and a predetermined point upon the left side of a representation of the timeline element; and
the right edge is defined by a line joining a predetermined point upon the right side of the representation of the individual one of the story elements and a predetermined point upon the right side of the representation of the timeline element.

4. The method of claim 1, wherein
the graphical indication is dynamically updated even where one of the elements has been shifted off the display area of the graphical user interface; and
the graphical indication stops at the edge of the display area.

5. The method of claim 1, wherein the individual one of the story elements is at least one of:
specified by a current location of playback of the media composition by the media composition application;
corresponds to one or more timeline elements that are selected by a user of the media composition system; and
selected by a user of the media composition application.

6. The method of claim 1, wherein each story element within the plurality of story elements is depicted with dimensions that are independent of a temporal duration of the media item associated with that story element within the plurality of story elements.

7. The method of claim 1, wherein each story element within the plurality of story elements is depicted with dimensions that are independent of a temporal duration of the media item associated with that story element within the plurality of story elements such that a cursor movement within the timeline representation of the media composition provides a continuous movement of the timeline representation of the media composition but a discontinuous storyboard representation and vice-versa.

8. The method of claim 1 further comprising:
in the second mode or the third mode
enabling a user of the media composition application to shift the displayed storyboard representation forward or backward in time; and
updating the graphical indication of a relationship between the individual one of the story elements and its corresponding one or more timeline elements to accommodate a new displayed location of the individual one of the story elements.

9. The method of claim 8 further comprising:
automatically shifting the timeline representation in order to display a portion of the timeline that includes at least one element that corresponds to a displayed element of the storyboard representation.

10. The method of claim 1, further comprising:
in the second mode or the third mode
enabling a user of the media composition system to shift the displayed timeline representation forward or backward in time; and
updating the graphical indication of a relationship between the individual one of the story elements and its corresponding one or more timeline elements to accommodate a new displayed location of the corresponding one or more timeline elements.

11. The method of claim 10, further comprising:
automatically scrolling the storyboard representation in order to display a portion of the storyboard that includes at least one element that corresponds to a displayed element of the timeline.

12. The method according to claim 1, wherein
each story element corresponds to one of a video clip, a transition, an image, and a composition of the foregoing.

13. The method according to claim 1, wherein
the graphical indication comprises displaying the storyboard element and each one of the one or more timeline elements corresponding to the storyboard element with at least one of a border and a fill contrasting to the graphical user interface.

14. The method according to claim 1, wherein
the corresponding timeline segment to the selected story element which remains displayed is one corresponding timeline element of a plurality of corresponding timelines elements; and
the graphical element linking between the corresponding timeline segment and the selected story element is one of a plurality of visual elements each linking corresponding timeline element of a plurality of corresponding timelines elements to the storey board element.

15. The method according to claim 1, further comprising
in a third mode of operation playing back a predetermined portion of the media composition; wherein
the graphical user interface displaying during playback a playback bar with an indication of current location of the playback and a visual element linking a current timeline element associated with that portion of the media composition relating to current location of the playback within the playback bar and its associated storyboard element.

16. A computer program product comprising:
a non-transitory computer-readable medium with computer program instructions encoded thereon, wherein the computer program instructions, when processed by a computer, instruct the computer to perform a method of representing a media composition in a graphical user interface of a media composition application, the method comprising:
displaying a portion of a storyboard representation of the media composition in the graphical user interface in dependence upon a display mode of the media composition application, wherein the storyboard representation includes a plurality of story elements arranged in a sequence in which the story elements appear in the media composition, and wherein each story element corresponds to a different media item included in the media composition during its composition, wherein a different media item is not a portion of another media item included in the media composition or derived from processing a predetermined portion of the media composition;
displaying a portion of a timeline representation of the media composition in the graphical user interface in dependence upon the display mode of the media composition application, wherein the timeline representation comprises a plurality of timeline elements each associated with a predetermined story element of the plurality of story elements that are arranged in a sequence in which the timeline elements appear in the media composition and displayed with a linear dimension defined by the display mode of the media composition application and a temporal duration of the timeline element within the associated story element;
receiving from the user a selection of a story element of the plurality of story elements or a selection of a timeline element of the plurality of timeline elements;
displaying in the graphical user interface a graphical element visually linking the selected story element of the plurality of story elements and its corresponding one or more timeline elements when the user selection was of the selected story element and dynamically updating the graphical representation in dependence upon the subsequent positions of the selected story element and its one or more associated timeline elements in dependence upon the user scrolling at least one of the storyboard representation and the timeline representation;
displaying in the graphical user interface a graphical element visually linking the timeline element of the plurality of timeline elements and its corresponding story element when the user selection was of the timeline element and dynamically updating the graphical representation in dependence upon the subsequent positions of the selected story element and its one or more associated timeline elements in dependence upon the user scrolling at least one of the storyboard representation and the timeline representation; wherein
in a first mode of operation the user may scroll the storyboard representation and the timeline representation independently of each other such that a selected story element remains displayed and its corresponding timeline element is shifted, wherein the graphical element is dynamically adjusted as the corresponding timeline element is shifted and the graphical user interface maintains displaying the graphical element between the timeline element of the plurality of timeline elements within the timeline representation of the media composition and its corresponding story element of the plurality of story elements within the storyboard representation of the media composition independent of whether the corresponding timeline element is still displayed, partially displayed, or no longer displayed; and in a second mode of operation the user may scroll the storyboard representation and the timeline representation independently of each other such that a selected timeline element remains displayed and its corresponding story element is shifted, wherein the graphical element is dynamically adjusted as the corresponding story element is shifted and the graphical user interface maintains displaying the correspondence between the timeline element of the plurality of timeline elements within the timeline representation of the media composition and its corresponding story element of the plurality of story elements within the storyboard representation of the media composition independent of whether the corresponding timeline element is still displayed, partially displayed , or no longer displayed.

* * * * *

UNITED STATES PATENT AND TRADEMARK OFFICE
CERTIFICATE OF CORRECTION

PATENT NO. : 10,504,561 B2  
APPLICATION NO. : 13/323346  
DATED : December 10, 2019  
INVENTOR(S) : Chris P. Demiris

Page 1 of 1

It is certified that error appears in the above-identified patent and that said Letters Patent is hereby corrected as shown below:

In the Claims

In Claim 14, Column 9, Line 57, delete "storey board" and insert --storyboard--

Signed and Sealed this
Eighteenth Day of August, 2020

Andrei Iancu
*Director of the United States Patent and Trademark Office*